United States Patent [19]
Carey et al.

[11] Patent Number: 5,821,925
[45] Date of Patent: Oct. 13, 1998

[54] COLLABORATIVE WORK ENVIRONMENT SUPPORTING THREE-DIMENSIONAL OBJECTS AND MULTIPLE REMOTE PARTICIPANTS

[75] Inventors: Richard Carey, Los Altos; Christopher F. Marrin, Fremont; David C. Mott, Mountain View, all of Calif.

[73] Assignee: Silicon Graphics, Inc., Mountain View, Calif.

[21] Appl. No.: 590,562

[22] Filed: Jan. 26, 1996

[51] Int. Cl.[6] .................................................. G06T 17/40
[52] U.S. Cl. ............................................ 345/331; 345/419
[58] Field of Search ...................................... 395/119, 153, 395/135, 329, 330, 331; 345/191, 145, 113, 419, 435, 329, 330, 331

[56] References Cited

U.S. PATENT DOCUMENTS

| | | | |
|---|---|---|---|
| 5,058,185 | 10/1991 | Morris et al. | 395/331 X |
| 5,107,443 | 4/1992 | Smith et al. | 395/158 |
| 5,206,934 | 4/1993 | Naef, III | 395/153 X |
| 5,208,583 | 5/1993 | Cusick et al. | 345/196 |
| 5,293,619 | 3/1994 | Dean | 395/650 |
| 5,408,470 | 4/1995 | Rothrock et al. | 370/62 |

OTHER PUBLICATIONS

Shu et al., "Teledesign: groupeare user experiments in three–dimensional computer–aided design", Collaborative Computing Mar. 1, 1994.

*Primary Examiner*—Mark K. Zimmerman
*Attorney, Agent, or Firm*—Sterne, Kessler, Goldstein & Fox P.L.L.C.

[57] ABSTRACT

A collaborative work environment supports manipulating an object defined by a three-dimensional model by multiple remote participants. A three-dimensional model of the object is able to be translated, rotated and scaled in a work area of a whiteboard associated with the collaborative work environment. Each of the remote participants is able to view, manipulate, and mark-up the three-dimensional model of the object so that the remote participants can work collaboratively together.

16 Claims, 19 Drawing Sheets

COLLABORATIVE WORK ENVIRONMENT SUPPORTING THREE-DIMENSIONAL OBJECTS AND MULTIPLE REMOTE PARTICIPANTS

CROSS REFERENCE TO RELATED APPLICATIONS

This application is related to a commonly owned application, filed concurrently herewith, entitled "A Method for Selecting a Three-Dimensional Object from a Graphical User Interface," having application Ser. No. 08/590,561, now U.S. Pat. No. 5,694,532, which is incorporated herein by reference.

BACKGROUND OF THE INVENTION

1. Field of the Invention

The present invention relates generally to three-dimensional computing. More specifically, the present invention relates to collaboratively manipulating three-dimensional objects by multiple, remote participants.

2. Related Art

As computers and communication networks become increasingly more powerful, users demand the ability to share more and more information. This, coupled with an increasing awareness of the need to develop products in shorter time and for less cost, has led to the development of tools that allow users of remotely located computer systems ("remote participants") to interact across communications networks.

One such tool is referred to as a collaborative work environment or "shared whiteboard." The collaborative work environment allows multiple remote participants to work simultaneously on the whiteboard. The whiteboard and its contents are visible to each remote participant through a display of the remote participants' computer system. The whiteboard functions as a single "electronic chalkboard" where each participant uses his "chalk" to write on the chalkboard for all participants to view, modify, and/or delete. The chalkboard is a work area depicted in the display of the computer system. The chalk includes Any input device associated with the computer system including, but not limited to, a keyboard, a mouse, a stylus pen, a data file, an optical scanner, and/or data from any number of sensors or devices that can be received by a computer (e.g., video camera). Each remote participant may use his chalk to write on the chalkboard and each of the other remote participants is able to view simultaneously (or apparently so) what is being written.

Many examples of conventional collaborative work environments exist in the marketplace. Many collaborative work environments allow only text to be entered, viewed, or manipulated. Other collaborative work environments allow two-dimensional images or drawings to be entered, viewed, or manipulated. However, conventional collaborative work environments do not permit remote participants to view or manipulate three-dimensional models of objects.

Some existing technologies allow remote participant to navigate through a three-dimensional scene or "world". Each remote participant independently navigates his own "camera" through the world thereby viewing the world. In some of these worlds, each remote participant is able to view the camera of the other remote participants. However, none of the remote participants is able view the world through the camera of any other emote participant. In other words, each remote participant views the world from his own individual perspective. Thus, true collaborative manipulation of a three-dimensional model of an object is not possible using this type of technology because each remote participant is operating from an independent perspective.

What is needed is a collaborative work environment that supports the manipulation of three-dimensional models of objects by multiple remote participants.

BRIEF SUMMARY OF THE INVENTION

The present invention is a collaborative work environment that supports the manipulation of a three-dimensional model of an object by multiple remote participants. In addition to the three-dimensional model of the object, the collaborative work environment supports conventional manipulation of a two-dimensional image of an object. Furthermore, the remote participants can make annotations associated with either the models or the images.

Manipulation of the three-dimensional model of the object supported by the present invention is communicated to each of the remote participants in the collaborative work environment thereby allowing remote each participant to view a manipulated model of the object. In particular, rather than communicating a rendered image of the manipulated model of the object to each remote participant, i.e., the manipulated model of the object rendered into individual pixels, information describing the manipulation of the three-dimensional model of object is communicated to each remote participant. Each of the remote participants' workstations uses this information to independently construct the manipulated model of the object. Then, each workstation renders an image of the manipulated model and displays the rendered image. This results in a reduction in a communication bandwidth required between the remote participants.

One of the features of the present invention is that any of the remote participants in the collaborative work environment can manipulate the object. The manipulations include translation, rotation, or scaling. In addition to these manipulations, each participants is able to import or export three-dimensional models of object generated by a local instance of a three-dimensional authoring tool operating on the workstation of the remote participant. This process is often referred as "cutting-and-pasting" the three-dimensional model of the object, or simply "cut-and-paste."

Another feature of the present invention is that the rendered image of the object is generated locally by each of the remote participants' workstations. This allows the three-dimensional coordinate information describing the three-dimensional model of the object and any manipulations to be communicated over the communication network rather than communicating the rendered image of the object. This significantly reduces the amount of network bandwidth required in order to facilitate the collaborative work environment.

Still another feature of the present invention is that the remote participants can ultimately share the three-dimensional model of the object. Remote participants can place models into the work area and other remote participants can retrieve them.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Overview

The present invention is directed toward a system and method for manipulating three-dimensional models of objects in a collaborative work environment by multiple, remote participants. The present invention allows remote participants to collectively view, manipulate, and mark-up a three-dimensional model of an object in a work area referred to as a whiteboard. Each remote participant is able to manipulate, e.g., rotate, translate, scale, etc., the three-dimensional model of the object and view the manipulations on the three-dimensional model of the object by the other remote participants. In addition, each remote participant is able to cut-and-paste three-dimensional models between the whiteboard and a three-dimensional authoring tool used to edit the three-dimensional model of the object.

Example Environment

The present invention is now described in terms of an example environment. Specifically, the present invention is described in terms of viewing, manipulating, and marking-up a three-dimensional model of an object on a conventional CRT terminal of a computer workstation. As is well known in the art, the conventional CRT terminal is limited to displaying a two-dimensional image. Thus, the three-dimensional model of the object must be rendered into a two-dimensional image of the object before any depiction of the object can be displayed on the conventional CRT terminal. Rendering is well known in the art and as such, will not be described further. The rendered two-dimensional image of the object represents a projection of the three-dimensional model of the object onto a plane capable of being displayed by the conventional CRT terminal. The importance of this is that the three-dimensional model of the object differs from the two-dimensional image of the object in that the model maintains information pertaining to depth not present in the rendered image or other two-dimensional images.

Description of the present invention in these terms is provided for convenience only. It is not intended that the invention be limited to application in this example environment. For example, the present invention could applied to devices capable of actually displaying three-dimensional images of the object (e.g., holograms, etc.). In this type of environment, rendering the three-dimensional model of the object into the two-dimensional image of the object would be an unnecessary step in the practice of this invention. Furthermore, after reading the following description, it will become apparent to a person skilled in the relevant art how to implement the invention in alternative environments as well.

Figure 1:
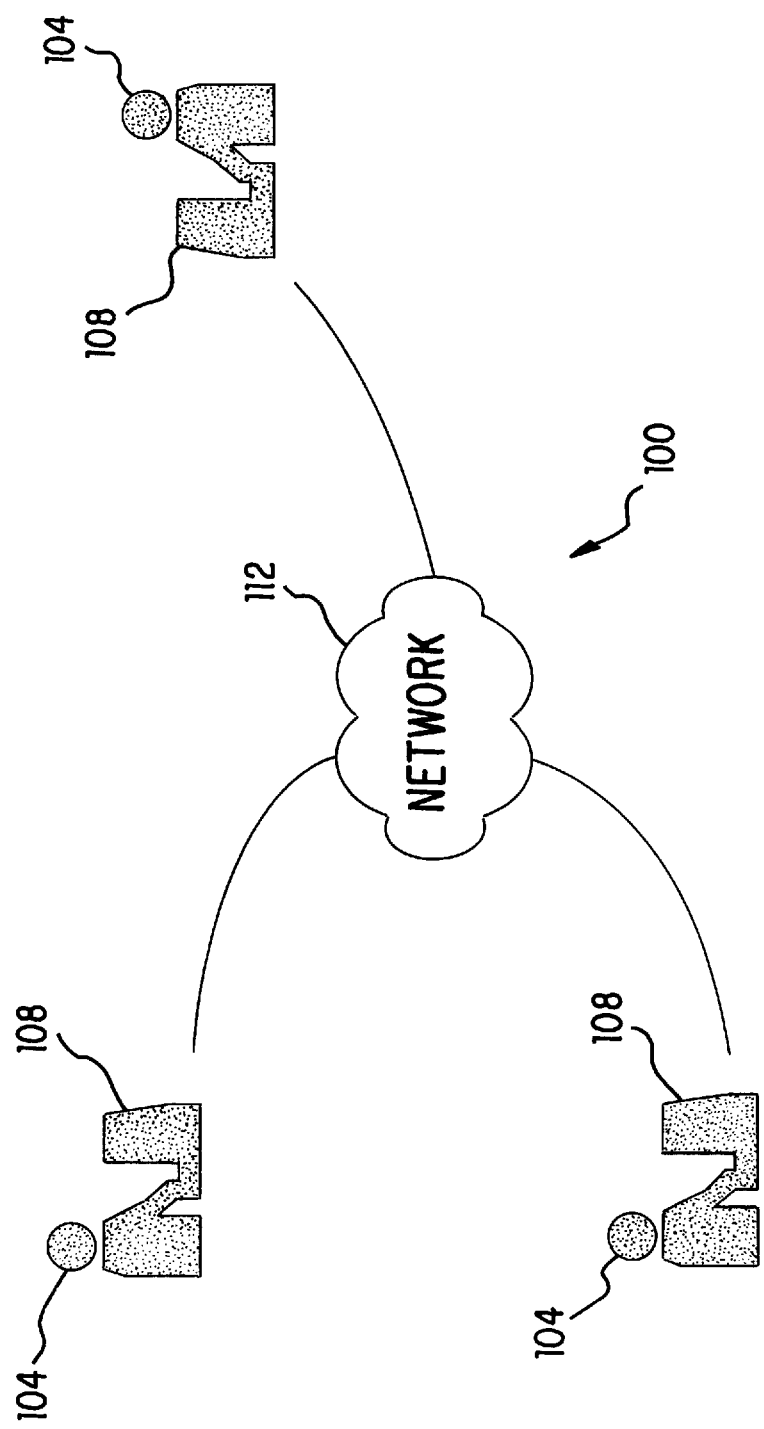
FIG. 1 is a diagram illustrating an example collaborative work environment.

FIG. 1 is a diagram illustrating an example collaborative work environment 100. Collaborative work environment 100 is comprised of several remote participants 104 (three are shown), a communication network 112 and workstations 108 (three are shown). Remote participants 104 work collaboratively with one another through their workstations 108 via communication network 112. Examples of communication network 112 include a wide area network (WAN) and a local area network (LAN). Workstations 108 can include workstations, personal computers and other similar devices.

Figure 2:
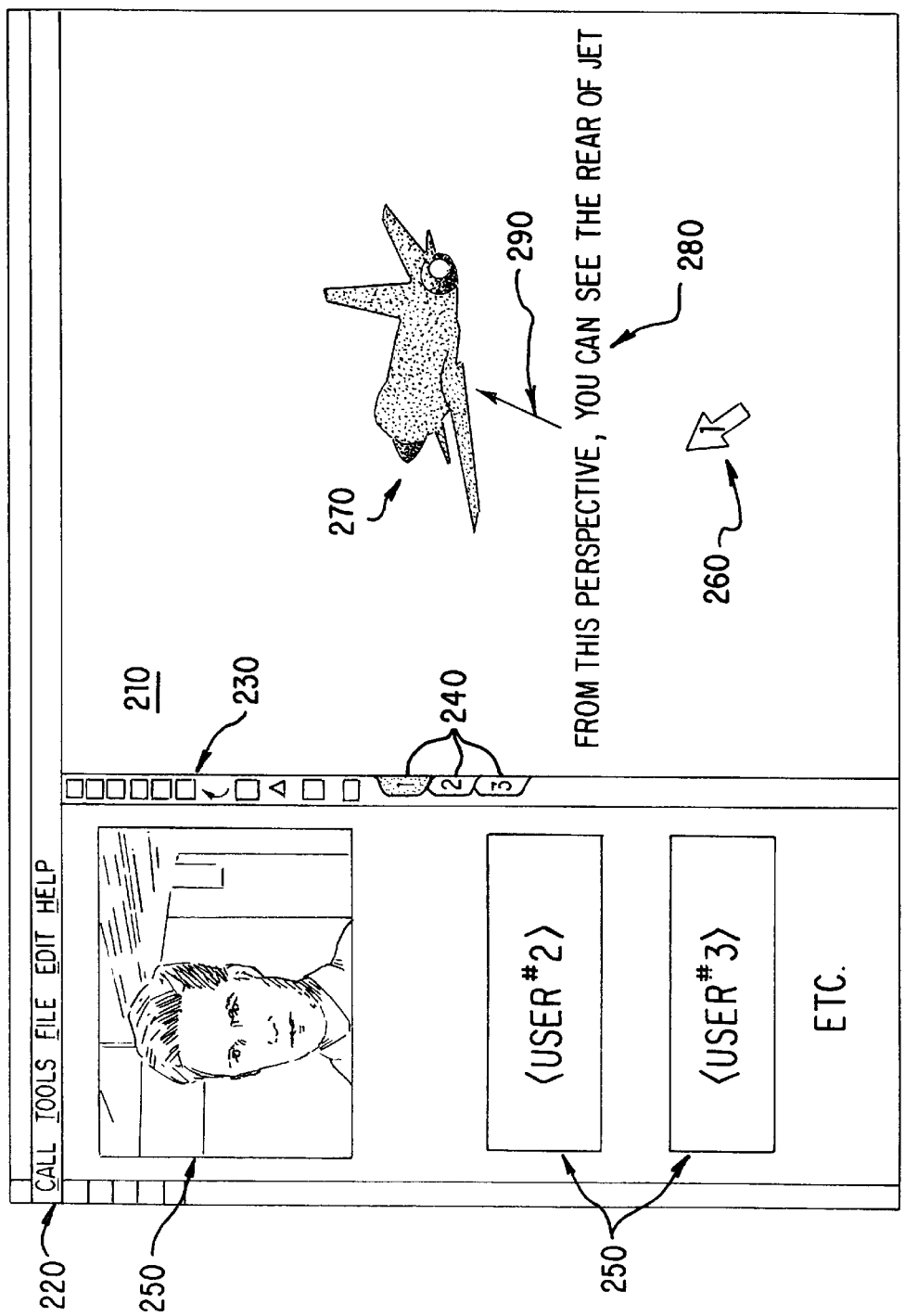
FIG. 2 is a diagram illustrating a whiteboard useful for working in a collaborative work environment according to one embodiment of the present invention.

FIG. 2 is a diagram illustrating a whiteboard 200 useful for working in collaborative work environment 100 according to one embodiment of the present invention. In collaborative work environment 100, each remote participant 104 opens a local instance of whiteboard 200 that operates on workstation 108 of each remote participant 104. A session of collaborative work environment 100 is initiated, for example, by one remote participant 104 calling one or more other remote participants 104. The other remote participants 104 answer to participate in the session. Calling and answering techniques is a collaborative work environment are well known in the art.

In one embodiment of the present invention, whiteboard 200 includes a work area 210, a menu bar 220, a tool bar 230, one or more whiteboard pages 240, one or more images 250 of remote participants 104, a cursor 260 for each of remote participants 104, a three-dimensional model of an object 270 (object 270), a text entry 280, and a drawing entry 290. Each of these elements is described in further detail below.

Whiteboard

Work area 210 is an area in whiteboard 200 where remote participants can view, manipulate, and mark-up items such as an image (not shown), object 270, text entry 280, or drawing entry 290. Work area 210 functions as a chalkboard for collaborative work environment 100. Any operations that are performed by one of remote participants 104 are communicated to and viewed by all other remote participants 104. These operations include importing items (e.g., opening data/object files, etc.), entering items, drawing items, deleting items, etc., as well as moving these items around work area 210. With respect to two-dimensional images, text entry 280, and drawing entry 290, these former operations are well known in the art of popular "paint" programs.

Additional operations available in work area 210 include gesturing. Gesturing includes making annotations to elements in work area 210 to describe or point out certain features to remote participants 104. Such annotations include, for example, text entry 280 and drawing entry 290 as shown in FIG. 2. Gesturing also includes using a input device, such as a mouse, to maneuver cursor 260 belonging to remote participant 104 in a manner similar to a lecturer using a pointer device to indicate various features on a chalkboard. Gesturing includes maneuvering cursor 260 in a circular fashion around a particular feature of object 270. For example, again referring to FIG. 2, gesturing may include maneuvering cursor 260 in a circular fashion around a starboard wing of object 270. Gesturing also includes maneuvering cursor 260 in a manner, for example, to show a direction of flight of object 270. These examples of gesturing provided above are used for explanatory purposes only and in no way are intended to limit the scope of the present invention.

In addition to the operations described above, work area 210 also supports manipulating a three-dimensional model of object 270 (referred to as object 270). These operations include translating, rotating, and scaling object 270. Other operations include cutting-and-pasting object 270 between work area 210 and a local instance of a three-dimensional authoring or editing tool operating on workstation 108 of remote participant 104. These operations are discussed in further detail below.

Menu bar 220 includes various pull-down menus useful for performing various activities in whiteboard 200. In one embodiment of the present invention, menu bar 220 includes menus entitled Call, Tools, File, Edit, and Help. These menus are implemented according to techniques well known in the art of graphical user interfaces and as such, are not described in the present application. Further description of menu bar 220 is included in "InPerson 2.1 User's Guide," Document Number 007-2253-002, available from Silicon Graphics, Inc., Mountain View, Calif. which is incorporated herein by reference as if produced in full below.

Tool bar 230 includes various tools useful for performing various operations in work area 210. Tool bar 230 functions as a shortcut device for selecting tools from the Tool menu found on menu bar 220. Tool bar 230 includes various tools found in various "paint" programs and is not described in the present application. Further description of tool bar 230 is also available in "InPerson 2.1 User's Guide."

Whiteboard pages 240 represent one or more work areas 210 in which remote participants 104 operate. In one embodiment of the present invention, different whiteboard pages 240 available during a particular session are identified by index tabs. For example, three index tabs are shown in FIG. 2 representing three whiteboard pages 240. In this particular embodiment, the index tab corresponding to whiteboard page 240 currently being viewed is identified by a different color. Other implementations of identifying whiteboard pages 240 as would be apparent to one skilled in the art.

Remote participants 104 are able to operate in any or all of whiteboard pages 240. In addition, remote participants 104 are able to cut-and-paste various items back and forth between whiteboard pages 240.

In one embodiment of the present invention, an image 250 corresponding to a particular remote participant 104 is displayed in whiteboard 200. Image 250 may be text identifying a name of remote participant 104, a still photo of remote participant 104, or live video of remote participant 104 supplied by a camera (not shown) mounted to workstation 108 of remote participant 104. In any case, image 250 serves to identify each of remote participants 104 participating in the session of collaborative work environment 100.

In one embodiment of the present invention, each remote participant 104 is associated with a cursor 260 (only one cursor 260 is shown in FIG. 2). In another embodiment of the present invention, each remote participant 104 is associated with a unique cursor 260. Unique cursor 260 allows remote participants 104 to identify who is performing which operations in work area 210. In terms of the chalkboard analogy, unique cursor 260 allows remote participants to determine who is drawing or gesturing on the chalkboard.

In one embodiment, unique cursor 260 is identified with a number corresponding to remote participant 104 (as shown in FIG. 2 with '1' in cursor 260). In another embodiment, unique cursor 260 is identified with a different color corresponding to remote participant 104. In yet another embodiment, unique cursor 260 is a personal cursor 260 provided by remote participant 104.

According to the present invention, whiteboard 200 includes facilities for operating on a three-dimensional model of object 270. For purposes of this discussion, an object is a physical item, such as the actual physical jet whose image is depicted in FIG. 2. A three-dimensional model of the object is a computer-generated representation of the object possessing dimensional and relational aspects of the object in three dimensions (e.g., Cartesian coordinates x, y, and z). In other words, the object is defined by the three-dimensional model of the object. In this discussion, "a three-dimensional model of an object" is sometimes referred to simply, though technically inaccurately, as "object." As would be apparent to one skilled in the art, rather than the object being manipulated, the computer-generated three-dimensional model of the object is being manipulated.

Figure 3:
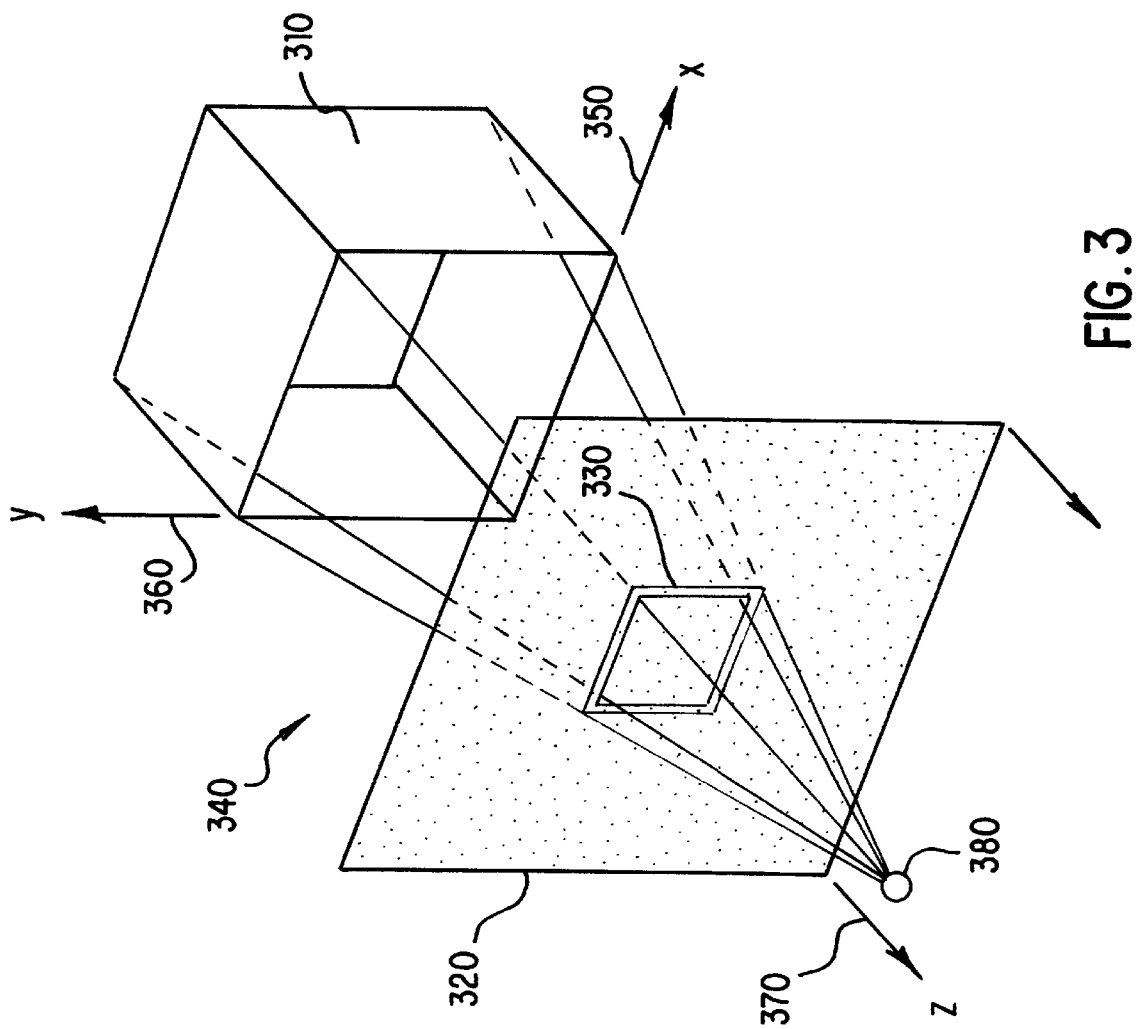
FIG. 3 is a diagram illustrating a relationship between a three-dimensional object and an image of the object.

FIG. 3 is a diagram illustrating a relationship between a three-dimensional object 310 and an image 330 of object 310. In the present invention, object 310 is described as a three-dimensional model in a coordinate frame, such as Cartesian coordinate frame 340 having an x-axis 350, a y-axis 360, and a z-axis 370. Image 330 is generated by projecting or rendering the model of object 310 into an image plane 320. In the present invention, image plane 320 corresponds to work area 210 viewed by remote participant 104. According to the present invention, each of remote participants view object 310 from a single, fixed perspective 380.

As depicted in FIG. 3, object 310 is three-dimensional whereas image 330 is two-dimensional. No information pertaining to depth is obtained or maintained for image 330 by workstation 108 or any other two-dimensional image. Thus, image 330 is incapable of being manipulated in a three-dimensional sense. Rather, image 330 is only capable of being manipulated in a two-dimensional sense. Only object 310 is capable of being manipulated in the three-dimensional sense. This is one factor distinguishing the present invention from conventional collaborative work environments.

The present invention allows object 310 to be manipulated in a manner similar to that used for two-dimensional images. For example, object 310 (and hence image 330) can be translated about work area 210. In addition, the present invention allows objects to be manipulated in a manner applicable only for three-dimensional models. These manipulations include rotation and scaling.

Translating a Three-Dimensional Model of an Object

Referring now to FIG. 2, in order to translate object 270 to a position in work area 210, object 270 is selected by one of remote participants 104. According to one embodiment of the present invention, a selection tool must be selected from either tool bar 230 or the Tool menu of menu bar 220. The selection tool indicates that selecting operations are to be interpreted from the mouse as opposed to drawing operations, etc. Once the selection tool has been retrieved, several methods for selecting object 270 are available. One method of selecting object 270 involves positioning cursor 260 over object 270 via the mouse and clicking one of its buttons. Another method of selecting object 270 involves dropping a corner and dragging a box encompassing object 270. Yet another method of selecting object 270 is "lassoing" object 270. "Lassoing" object 270 is the focus of the previously mentioned '532 patent entitled "A Method for Selecting a Three-Dimensional Object from a Graphical User Interface".

Once object 270 is selected, object 270 is dragged according to techniques well known in the art to a desired position in work area 210. The present invention allows object 270 to be translated to any position in work area 210.

Manipulating a Three-Dimensional Model of an Object

Figure 13:
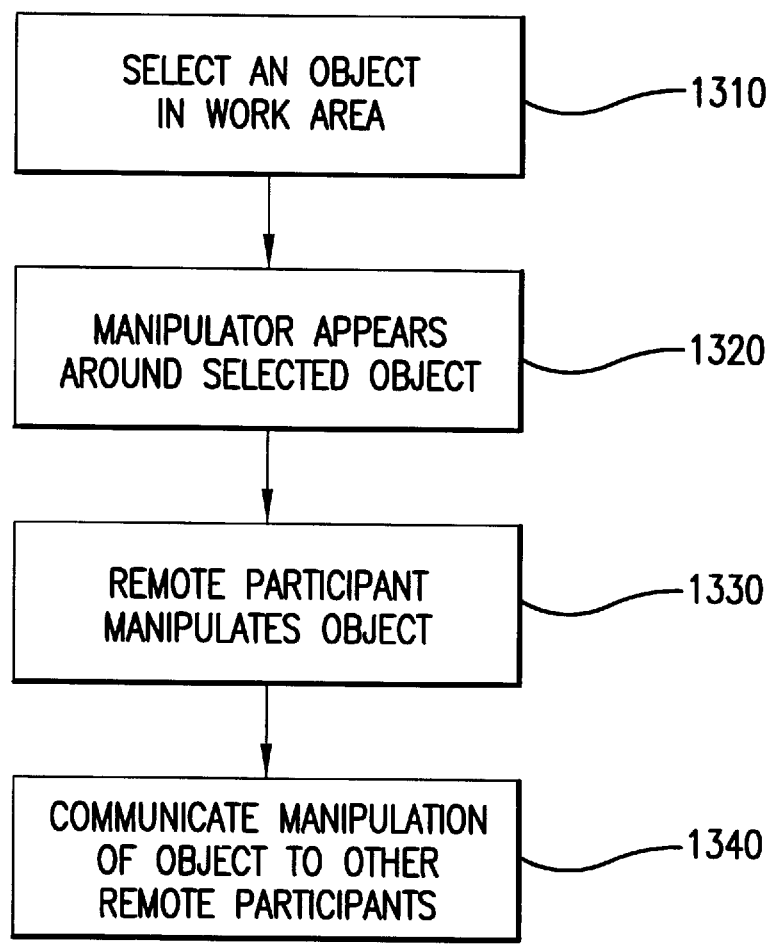
FIG. 13 is a diagram illustrating the steps performed in order to manipulate an object in the work area.

FIG. 13 is a diagram illustrating the steps performed in order to manipulate object 270 in work area 210. In a step 1310, object 270 is selected as discussed above.

Figure 4:
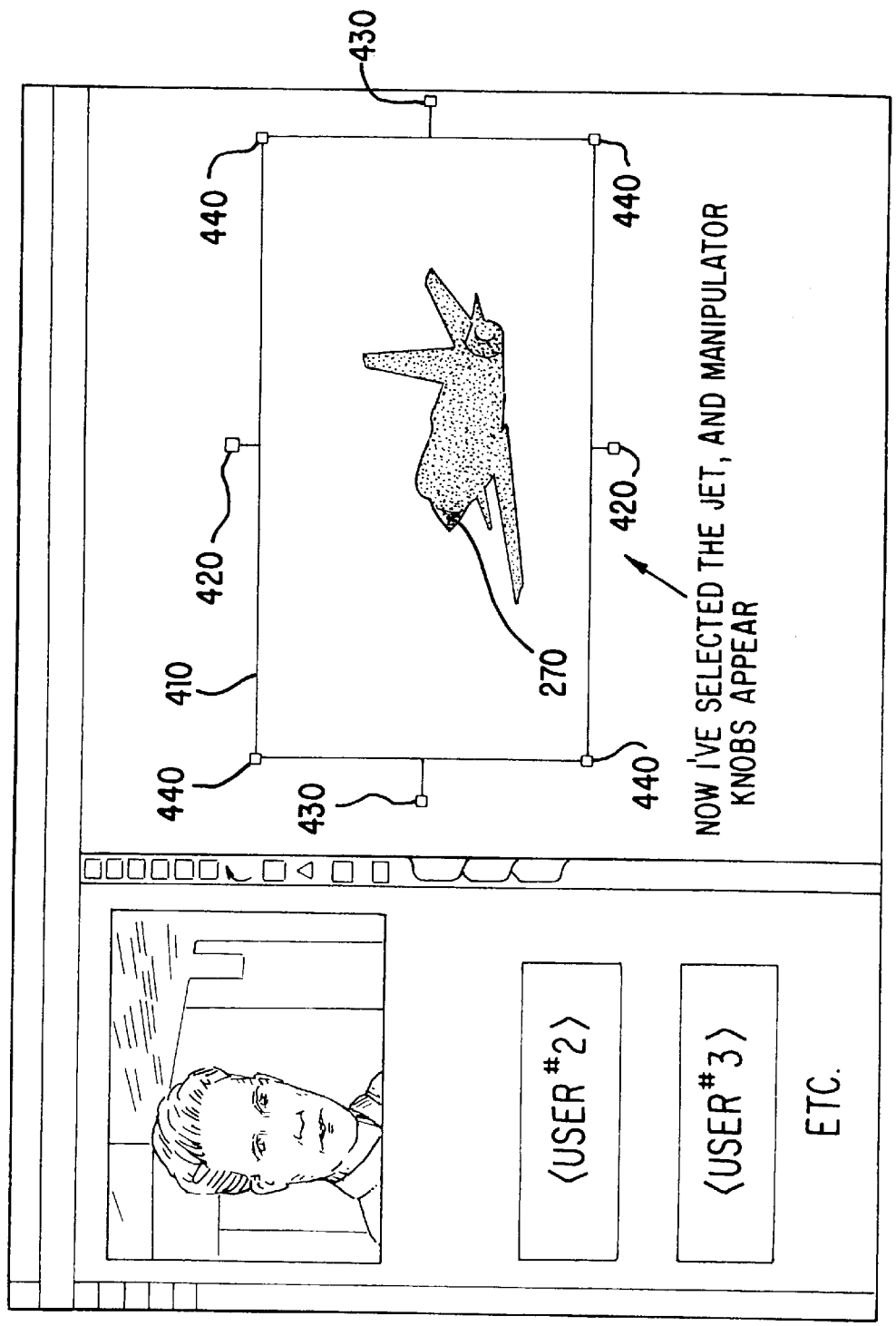
FIG. 4 is a diagram illustrating a manipulator useful for manipulating an object according to one embodiment of the present invention.

FIG. 4 is a diagram illustrating a manipulator 410 useful for manipulating object 270 according to one embodiment of the present invention. In a step 1320, manipulator 410 appears around object 270 after object 270 has been selected by one of remote participants 104. Manipulator 410 includes vertical axis knobs 420 (two are shown), horizontal axis knobs 430 (two are shown), and corner knobs 440 (four are shown). The functions of manipulator 410 and various knobs 420, 430, and 440 are discussed in detail below.

Figure 12:
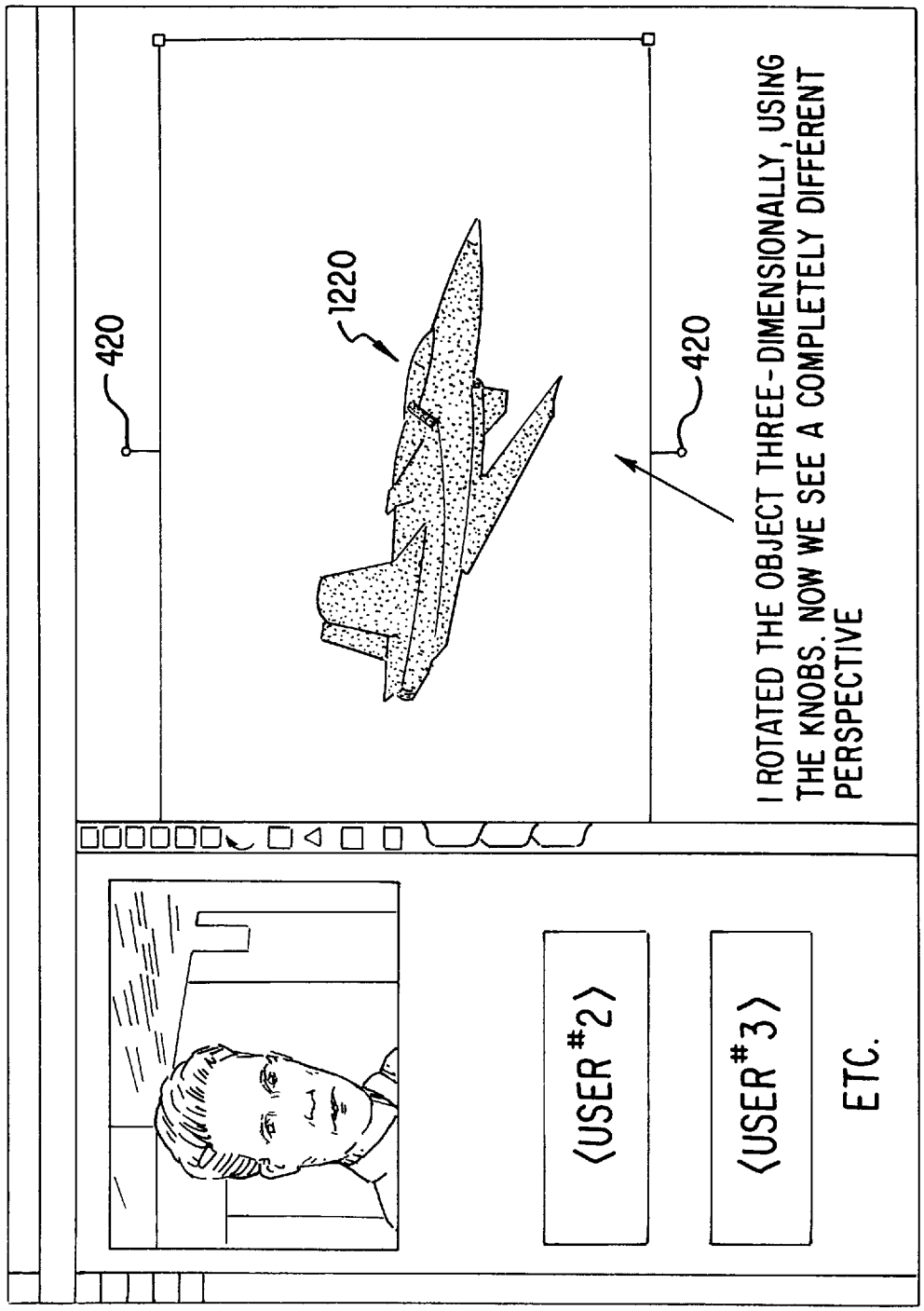
FIG. 12 is a diagram illustrating a manipulated object according to one embodiment of the present invention.

In a step 1330, object 270 is manipulated according to the present invention as discussed in further detail below. FIG. 12 is a diagram illustrating a manipulated object 1220 (specifically a rotated object 1220) corresponding to object 270. As shown in FIG. 12, a new perspective of object 270 is obtained. This is only accomplished by the fact that object 270 is defined by a three-dimension model rather than a rendered image as discussed above.

In a step 1340, the manipulation of object 270 is communicated to each of the other remote participants 104 in collaborative work environment 100. This communication is discussed in further detail below. At the end of step 1340, each remote participant 104 views rotated object 1220 from the same perspective as remote participant 104 who performed the rotation. Specifically, each remote participant 104 has the same depiction of rotated object 1220 as shown in FIG. 12.

According to one embodiment of the present invention, manipulating object 270 also includes rotating object 270 and scaling object 270. These manipulations are discussed in further detail below.

Rotating a Three-Dimensional Model of an Object

Figure 5:
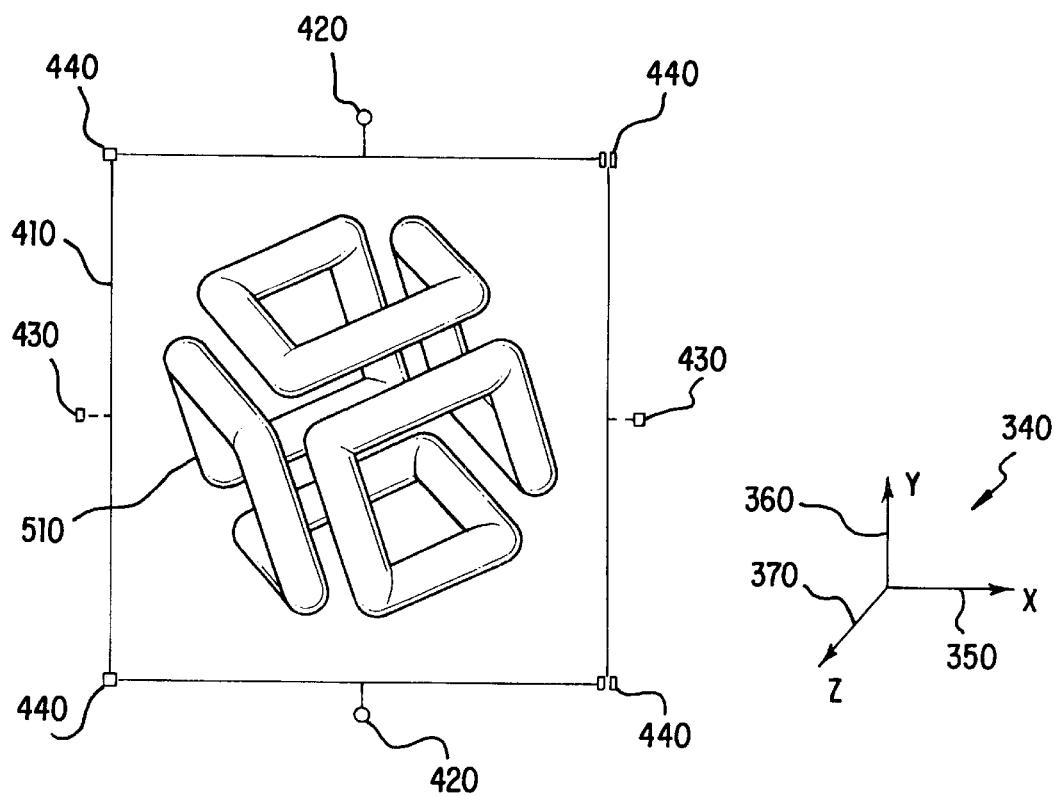
FIG. 5 is a diagram illustrating an object and a manipulator used to discuss rotating the object according to one embodiment of the present invention.

FIG. 5 is a diagram illustrating an object 510 and manipulator 410 used to discuss rotating according to one embodiment of the present invention. The rotations will be discussed in terms of coordinate frame 340 and include freeform rotation, rotation about x-axis 350, rotation about y-axis 360, and rotation about z-axis 370.

Freeform Rotation

Figure 7:
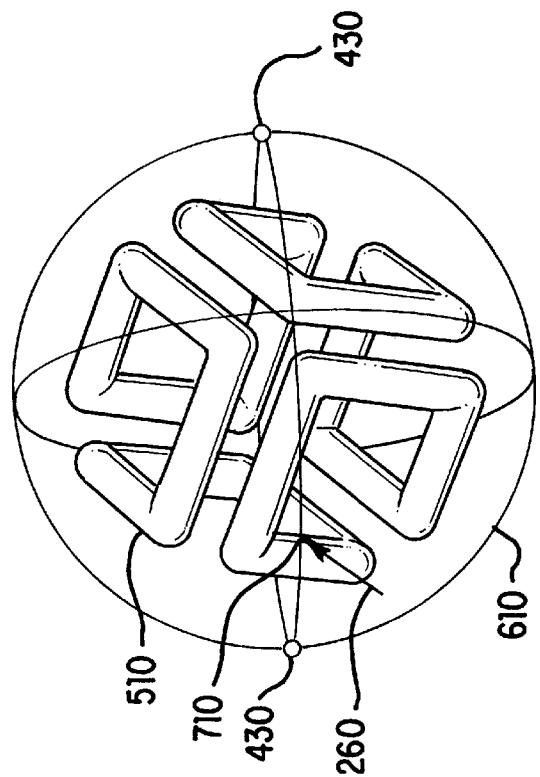
FIG. 7 is a diagram illustrating the object and the three orientation circles after performing a freeform rotation.
Figure 6:
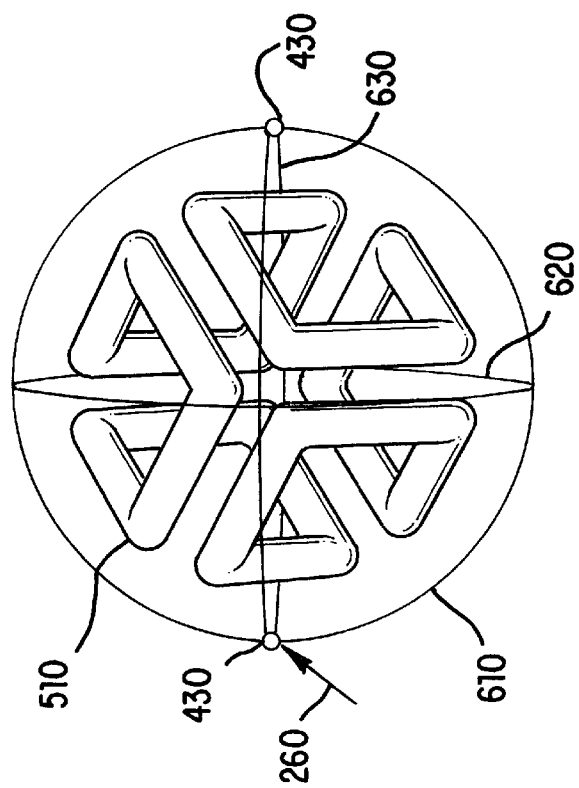
FIG. 6 is a diagram illustrating an object and three orientation circles used to visualize a freeform rotation of the object.
Figure 14:
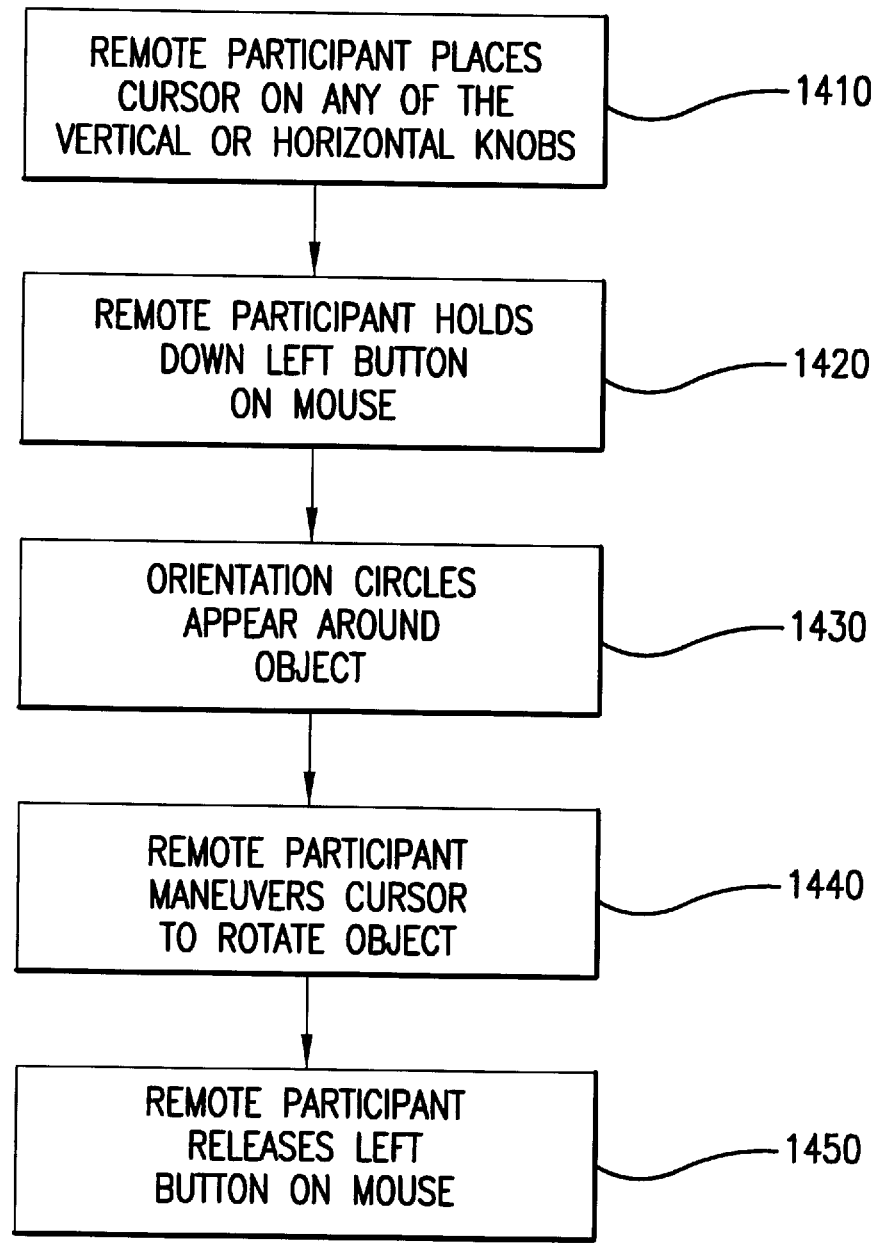
FIG. 14 is a diagram illustrating the steps performed during step 1330 to accomplish a freeform rotation.

FIG. 14 is a diagram illustrating the steps performed during step 1330 to accomplish a freeform rotation. FIG. 6 is a diagram illustrating object 510 and three orientation circles (shown as orientation circle 610, orientation circle 620 and orientation circle 630) used to visualize the freeform rotation of object 510. FIG. 7 is a diagram illustrating object 510 and orientation circles 610, 620, 630 after performing a rotation. The following discussion will refer to FIG. 5, FIG. 6, FIG. 7 and FIG. 14.

After manipulator 410 appears, in a step 1410, remote participant 104 places cursor 260 on any of vertical knobs 420 or horizonal knobs 430. In a step 1420, remote participant 104 holds down a mouse button to initiate the rotation. In a step 1430, orientation circles 610, 620, 630 appear as shown in FIG. 6. In a step 1440, remote participant 104 maneuvers cursor 260 while holding down the mouse button to rotate object 510 in a freeform manner, that is about any or all of the axes in coordinate frame 340.

Once remote participant 104 achieves a desired amount of rotation of object 510, in a step 1450, remote participant 104 releases the mouse button thereby completing the rotation of object 510. This completed rotation can be viewed by comparing FIG. 6 and FIG. 7. In particular, to visualize the rotation, note that the orientation of orientation circles 610, 620, 630 has changed along with object 510. In addition, note that cursor 260 has moved from an initial position at horizonal knob 430 to a final position 710.

Rotation About the Y-Axis

Figure 8:
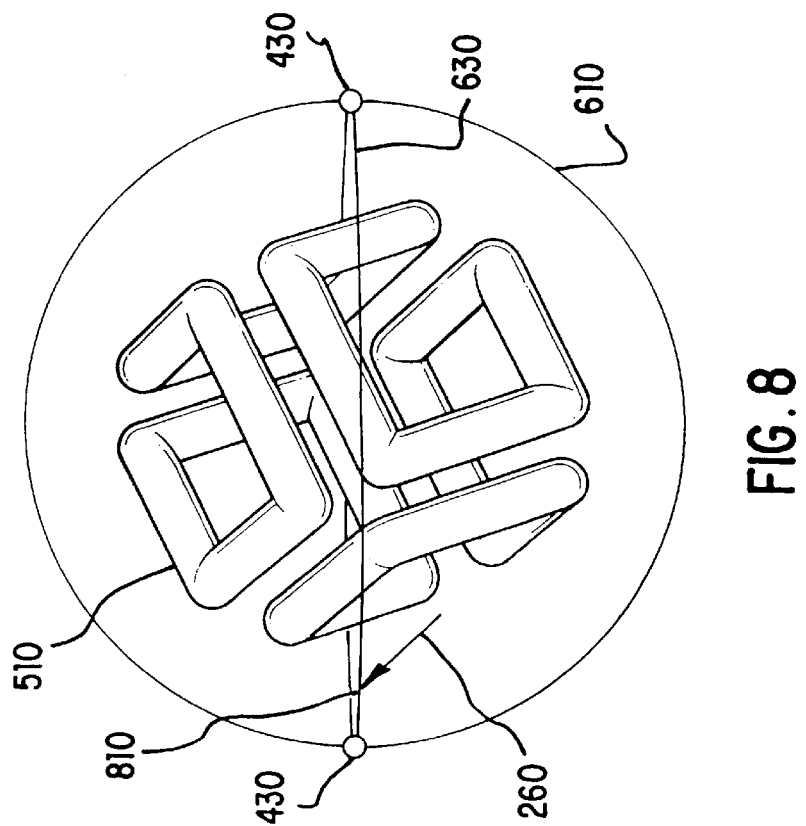
FIG. 8 is a diagram illustrating an object and two orientation circles used to visualize the rotation of the object about the y-axis.
Figure 15:
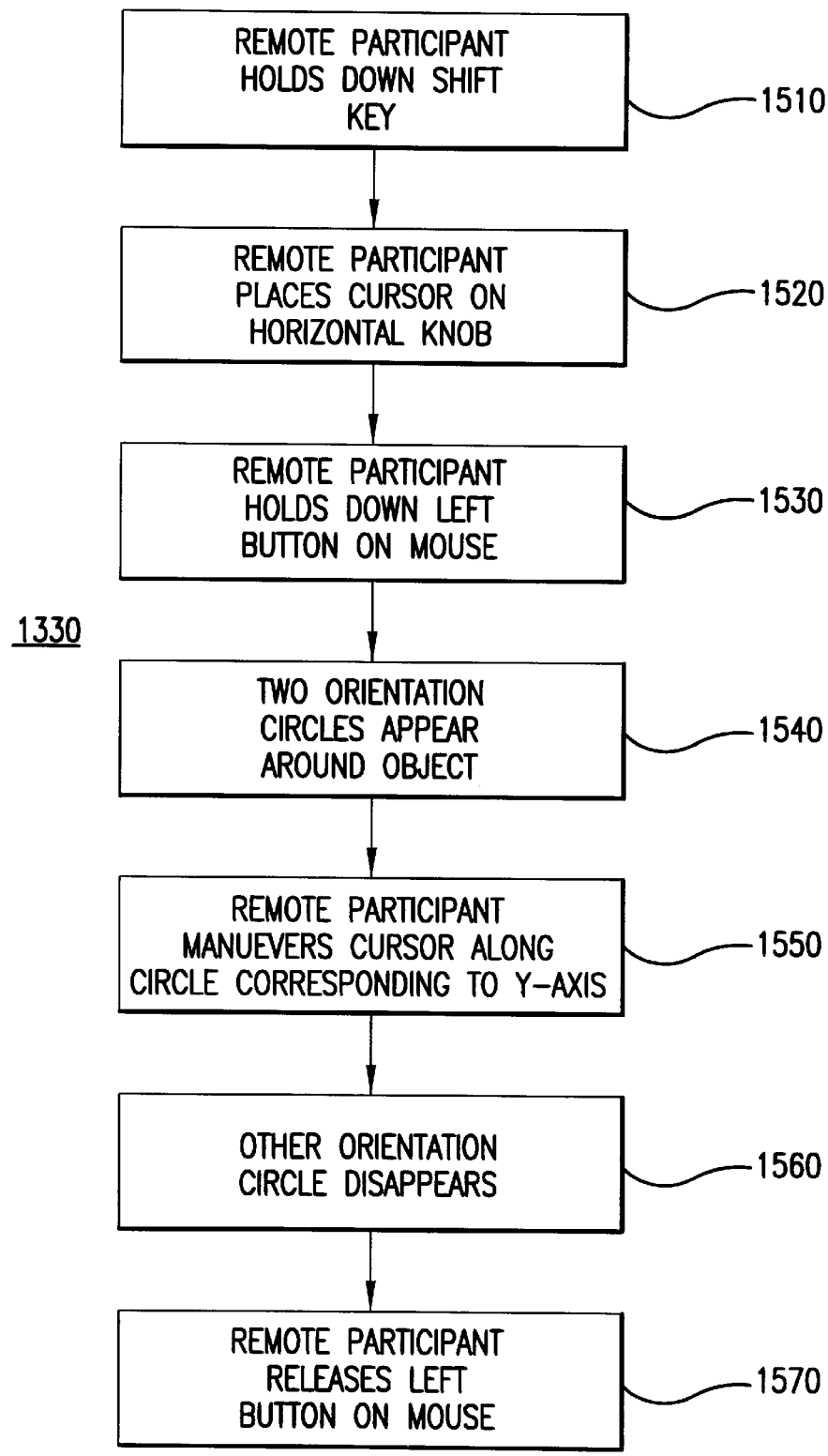
FIG. 15 is a diagram illustrating the steps performed during step 1330 to accomplish a rotation about the y-axis.

FIG. 15 is a diagram illustrating the steps performed during step 1330 to accomplish a rotation about y-axis 360. FIG. 8 is a diagram illustrating object 510 and two orientation circles (shown as orientation circle 610 and orientation circle 630) used to visualize the rotation of object 510 about y-axis 360. Note that orientation circle 620 is missing from FIG. 8 as compared with FIG. 6. This indicates to remote participant 104 that the rotation will be about either y-axis 360 or z-axis 370. The following discussion will refer to FIG. 5, FIG. 8, and FIG. 15.

After manipulator 410 appears, in a step 1510, remote participant 104 holds down a key on a keyboard of workstation 108 to indicate that the rotation is to be constrained to one axis of coordinate frame 340. In one embodiment of the present invention, this key is the <Shift>, though other keys could be used as would be apparent to one skilled in the art.

In a step 1520, remote participant 104 places cursor 260 on either of horizonal knobs 430. In a step 1530, remote participant 104 holds down the mouse button to initiate the rotation. This identifies either y-axis 360 or z-axis 370 as the axis about which the rotation is to be constrained. In a step 1540, two orientation circles 610, 630 appear as shown in FIG. 8. In a step 1550, remote participant 104 maneuvers cursor 260 along orientation circle 630 while holding down the mouse button to rotate object 510 about y-axis 360. In one embodiment of the present invention, in a step 1560, as soon as remote participant 104 maneuvers cursor 260 along orientation circle 630, orientation circle 610 disappears.

Once remote participant 104 achieves a desired amount of rotation of object 510, in a step 1570, remote participant 104 releases the mouse button and <Shift> thereby completing the rotation of object 510. This completed rotation can be viewed in FIG. 8. To visualize the rotation, note that cursor 260 has moved from an initial position at horizonal knob 430 to a final position 810.

Rotation About the X-Axis

Figure 9:
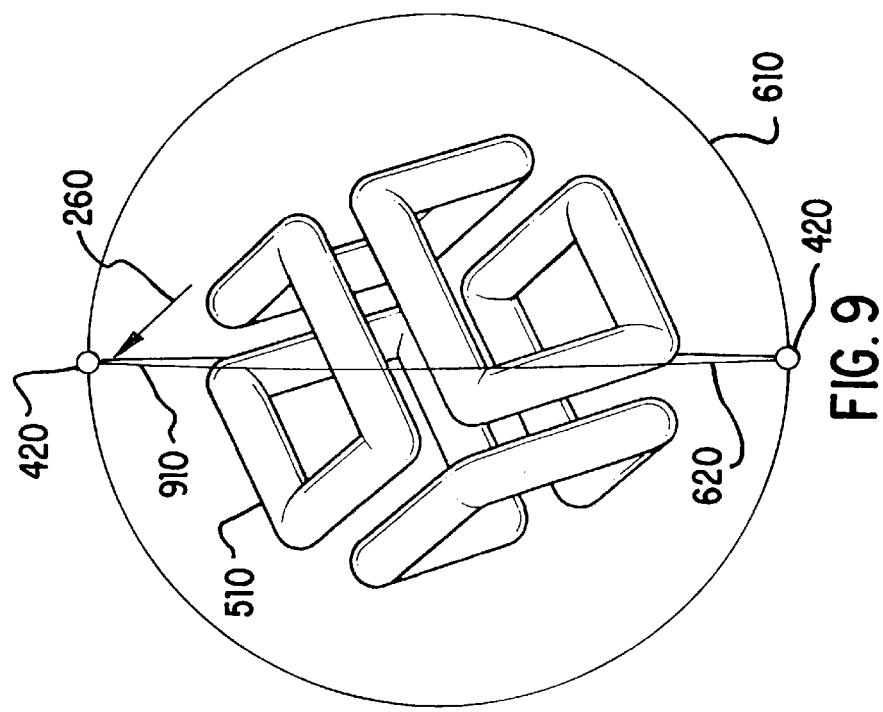
FIG. 9 is a diagram illustrating an object and two orientation circles used to visualize the rotation of the object about the x-axis.
Figure 16:
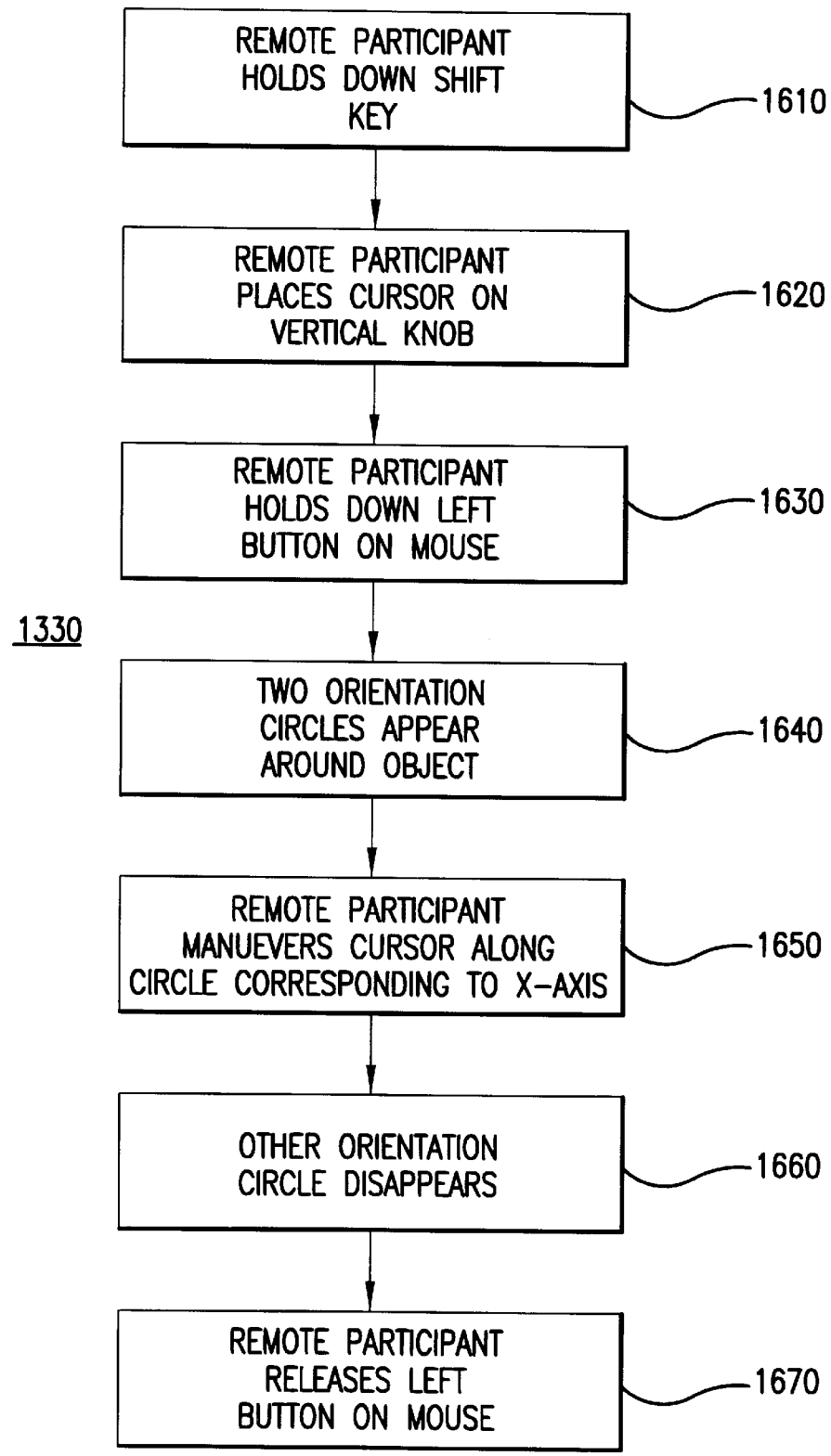
FIG. 16 is a diagram illustrating the steps performed during step 1330 to accomplish a rotation about the x-axis.

FIG. 16 is a diagram illustrating the steps performed during step 1330 to accomplish a rotation about x-axis 350. FIG. 9 is a diagram illustrating object 510 and two orientation circles (shown as orientation circle 610 and orientation circle 620) used to visualize the rotation of object 510 about x-axis 350. Note that orientation circle 630 is missing from FIG. 9 as compared with FIG. 6. This indicates to remote participant 104 that the rotation will be about either x-axis 350 or z-axis 370. The following discussion will refer to FIG. 5, FIG. 9, and FIG. 16.

After manipulator 410 appears, in a step 1610, remote participant 104 holds down the <Shift> key to indicate that the rotation is to be constrained to one axis of coordinate frame 340. In a step 1620, remote participant 104 places cursor 260 on either of vertical knobs 420. In a step 1630, remote participant 104 holds down the mouse button to initiate the rotation. This identifies either x-axis 350 or z-axis 370 as the axis about which the rotation is to be constrained. In a step 1640, two orientation circles 610, 620 appear as shown in FIG. 9. In a step 1650, remote participant 104 maneuvers cursor 260 along orientation circle 620 while holding down the mouse button to rotate object 510 about x-axis 350. In one embodiment of the present invention, in a step 1660, as soon as remote participant 104 maneuvers cursor 260 along orientation circle 620, orientation circle 610 disappears.

Once remote participant 104 achieves a desired amount of rotation of object 510, in a step 1670, remote participant 104 releases the mouse button and <Shift> thereby completing the rotation of object 510. This completed rotation can be viewed in FIG. 9. To visualize the rotation, note that cursor 260 has moved from an initial position at vertical knob 420 to a final position 910.

Rotation About the Z-Axis

Figure 10:
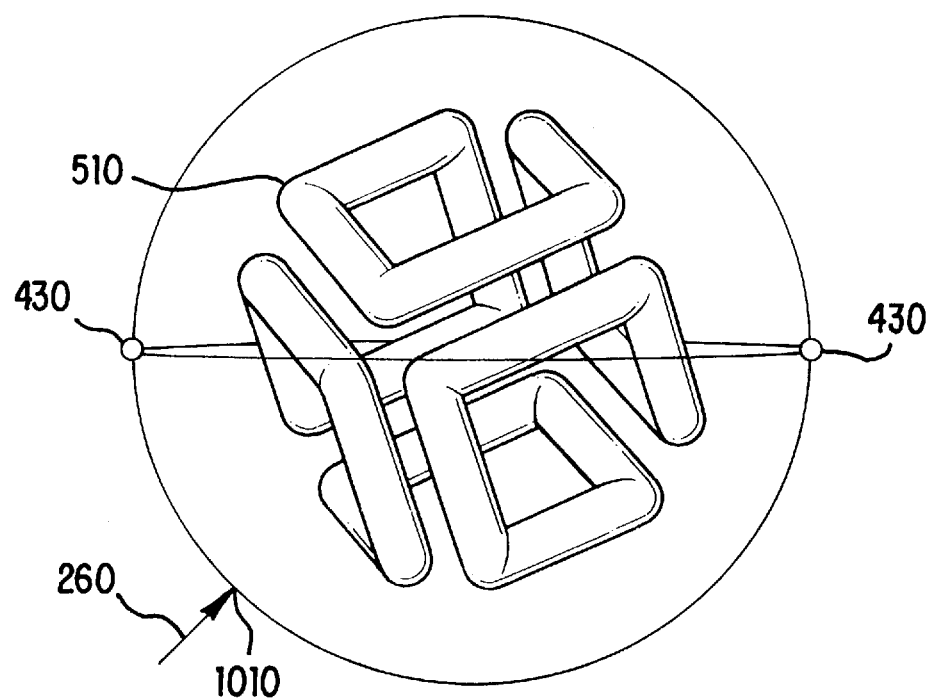
FIG. 10 is a diagram illustrating an object and two orientation circles used to visualize the rotation of the object about the z-axis.
Figure 17:
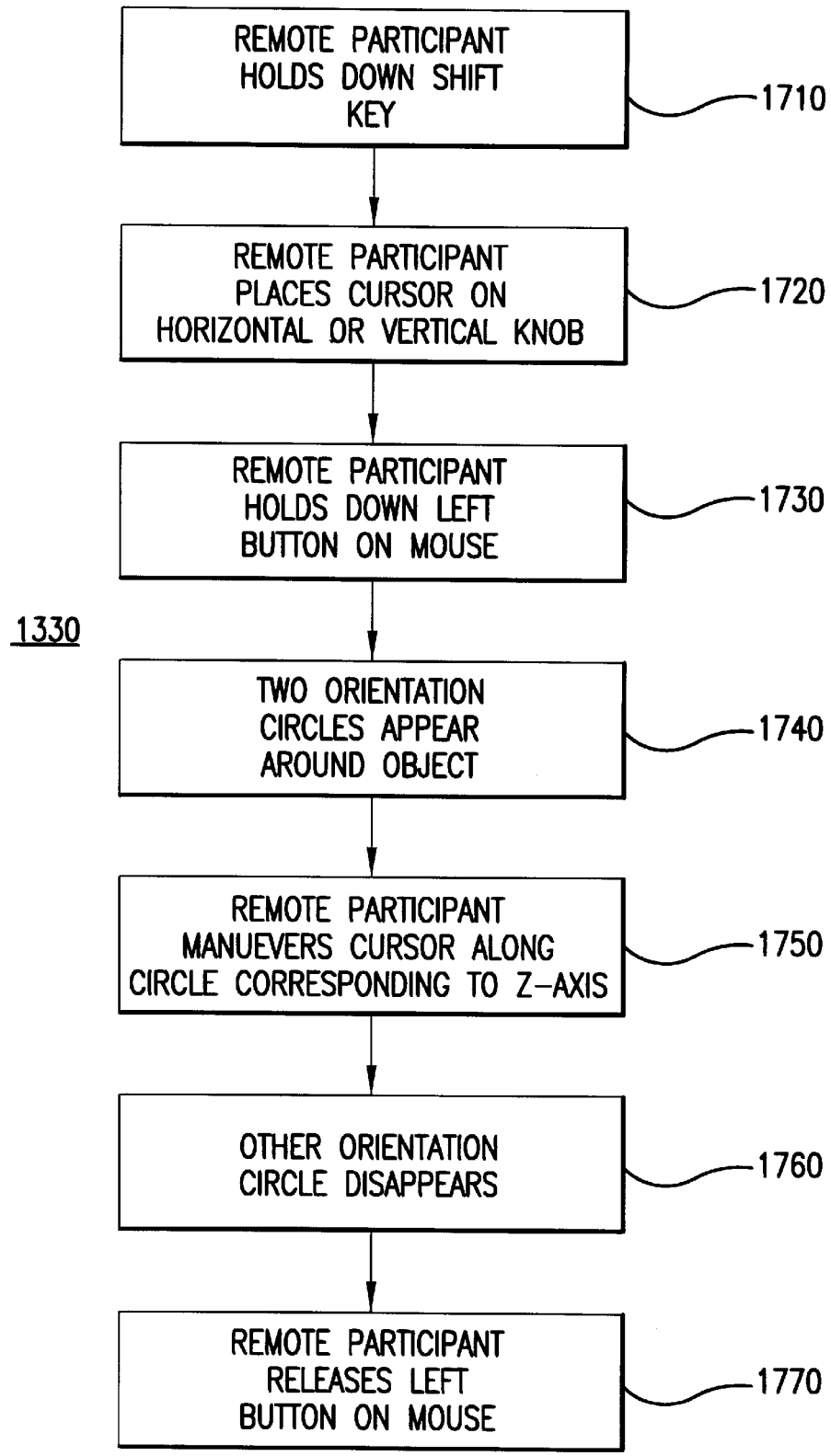
FIG. 17 is a diagram illustrating the steps performed during step 1330 to accomplish a rotation about the z-axis.

FIG. 17 is a diagram illustrating the steps performed during step 1330 to accomplish a rotation about z-axis 370. FIG. 10 is a diagram illustrating object 510 and two orientation circles (shown as orientation circle 610 and orientation circle 620) used to visualize the rotation of object 510 about z-axis 370. The following discussion will refer to FIG. 5, FIG. 10, and FIG. 17.

After manipulator 410 appears, in a step 1710, remote participant 104 holds down the <Shift> key to indicate that the rotation is to be constrained to one axis of coordinate frame 340. In a step 1720, remote participant 104 places cursor 260 on any of vertical knobs 420 or horizonal knobs 430. In a step 1730, remote participant 104 holds down the mouse button to initiate the rotation. In a step 1740, two orientation circles appear depending on whether vertical knobs 420 or horizonal knobs 430 were utilized in step 1720. As discussed above, if vertical knobs 420 were utilized, orientation circles 610, 620 appear; if horizonal knobs 430 were utilized, orientation circles 610, 630 appear. In either case, in a step 1750, remote participant 104 maneuvers cursor 260 along orientation circle 610 while holding down the mouse button to rotate object 510 about z-axis 370. In one embodiment of the present invention, in a step 1760, as soon as remote participant 104 maneuvers cursor 260 along orientation circle 610, the other orientation circle (i.e., orientation circle 620 or orientation circle 630) disappears.

Once remote participant 104 achieves a desired amount of rotation of object 510, in a step 1770, remote participant 104 releases the mouse button and <Shift> thereby completing the rotation of object 510. This completed rotation can be viewed in FIG. 10. Note that FIG. 10 indicates that horizonal knob 430 was utilized in step 1720 to initiate the rotation about z-axis 370. To visualize the rotation, note that cursor 260 has moved from an initial position at horizonal knob 430 to a final position 1010.

Scaling a Three-Dimensional Model of an Object

Figure 11:
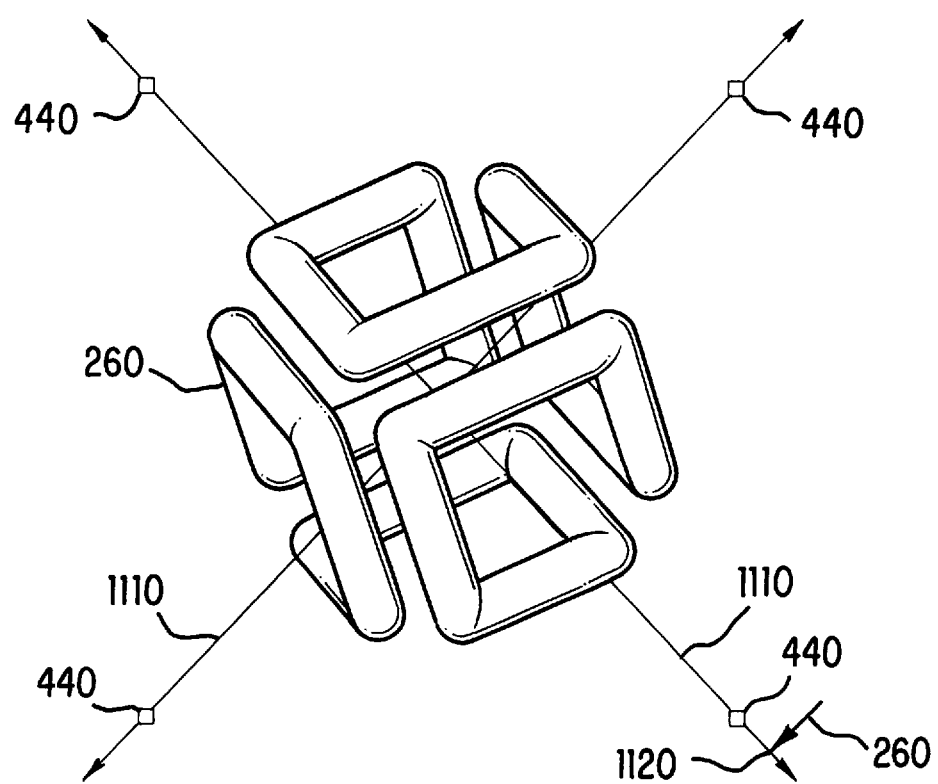
FIG. 11 is a diagram illustrating sizing arrows used to visualize the scaling of an object.
Figure 18:
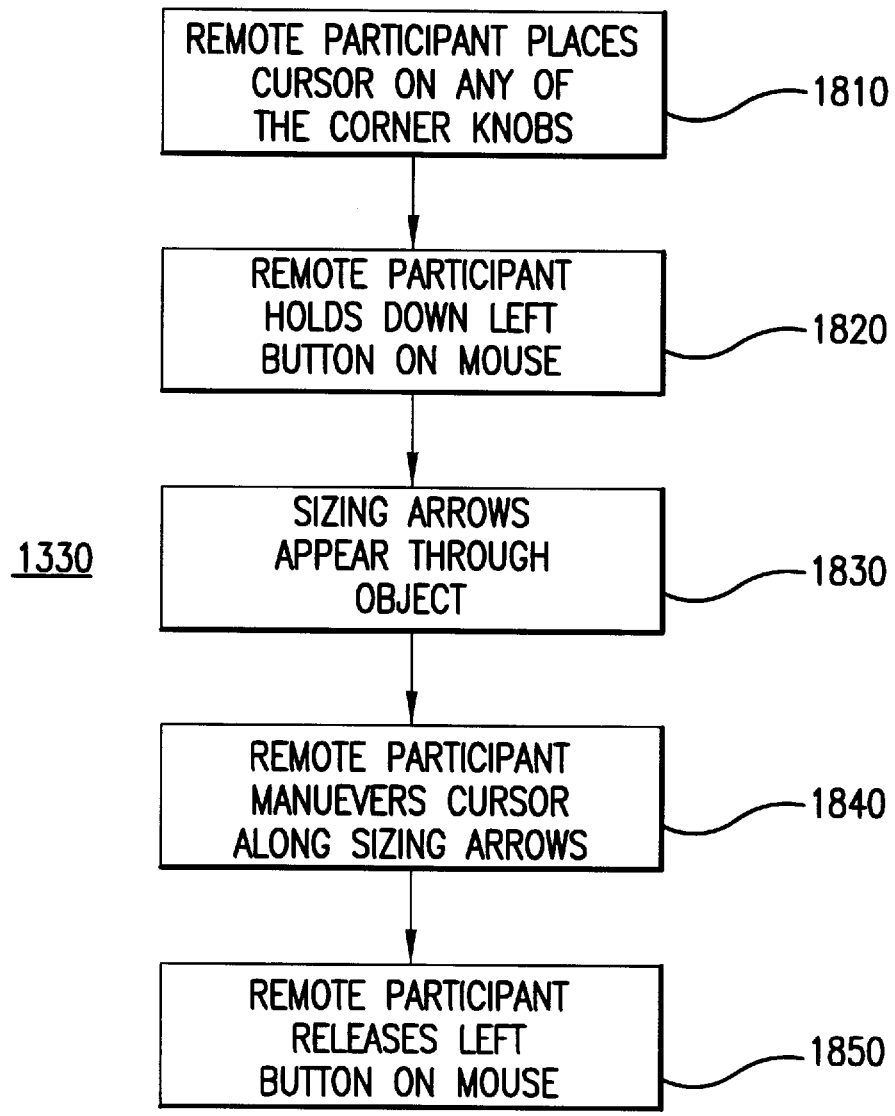
FIG. 18 is a diagram illustrating the steps performed during step 1330 to accomplish a scaling of the object.

FIG. 18 is a diagram illustrating the steps performed during step 1330 to accomplish a scaling of object 510. FIG. 11 is a diagram illustrating sizing arrows 1110 used to visualize the scaling of object 510. Scaling the three-dimensional model of object 510 will now be discussed with reference to FIG. 5, FIG. 11 and FIG. 18.

In a step 1810, remote participant 104 places cursor 260 on any corner knob 440. In a step 1820, remote participant 104 holds down the mouse button. In a step 1830, sizing arrows 1110 appear as shown in FIG. 11. In a step 1840, remote participant 104 maneuvers cursor 260 along one of sizing arrows 1110. Maneuvering cursor 260 towards the inside of object 510 reduces the size of object 510 while maneuvering cursor 260 away from the inside of object 510 increases the size of object 510. In a step 1850, remote participant 104 releases the mouse button once a desired scaling of object 510 has been achieved.

According to the present invention, the scaling performed on object 510 occurs proportionately in all three dimensions. Thus, object 510 retains its relative shape and appearance and only experiences a change in size.

Communicating Manipulations to Other Remote Participants

During a session of whiteboarding in collaborative work environment 100, all manipulations of object 270 are communicated to each remote participant 104 automatically.

FIG. 12 is a diagram illustrating a manipulated object 1220 corresponding to a manipulation of object 270 (shown in FIG. 2) as it appears to each of remote participants 104. According to the present invention, the manipulation of object 270 is communicated to each of remote participants 104. In one embodiment of the present invention, manipulated object 1220 is communicated to each of remote participants 104. In another embodiment, the maneuvers (e.g., cursor maneuvers, etc.) performed by remote participant 104 during the manipulation are communicated to each of remote participants 104.

Figure 21:
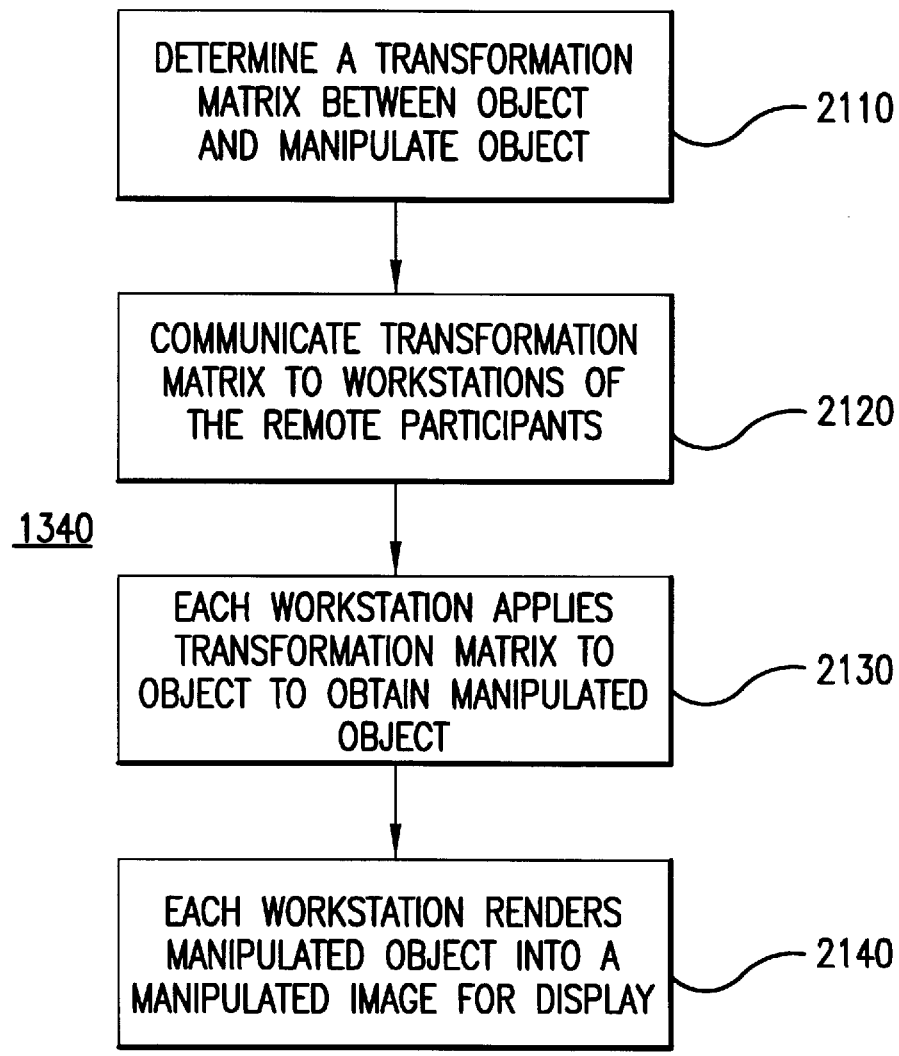
FIG. 21 is a diagram illustrating the steps performed in order to communicate a manipulation of the object to each of the remote participants according to a preferred embodiment of the present invention.

FIG. 21 is a diagram illustrating the steps performed in order to communicate a manipulation to each of remote participants 104 according to a preferred embodiment of the present invention. In this embodiment of the present invention, the manipulation of object 270 is communicated as information describing the manipulation of object 270. Specifically, in a step 2110, a transformation matrix describing the relationship between object 270 and manipulated object 1220 is determined. The transformation matrix is defined as the matrix that when applied to the three-dimensional model of object 270 results in the three-dimensional model of manipulated object 1220. Transformation matrices are well known in the art, and as such, are not described in further detail.

In a step 2120, the transformation matrix is communicated to each of remote participants 104 via communication network 112. By only communicating a transformation matrix corresponding to manipulated object 1220, a significant reduction in an amount of network bandwidth is achieved in comparison to communicating a rendered image of manipulated object 1220.

In a step 2130, each workstation 108 of remote participants 104 applies the transformation matrix to object 270 thereby obtaining manipulated object 1220. To be precise, each workstation 108 applies the transformation matrix to the three-dimensional model of object 270 to obtain a three-dimensional model of manipulated model 1220. Then, in a step 2140, each workstation 108 renders the three-dimensional model of manipulated object 1220 into a manipulated image for display in work area 210 of each workstation 108 as discussed above.

In a preferred embodiment of the present invention, the transformation matrix is communicated to remote participants 104 at a rate of 10 Hertz (Hz) during manipulations. Thus, remote participants 104 receive updates during manipulations of object 270 in increments of 0.1 seconds. This rate is adjustable depending on various system design considerations. Increasing the rate of updates improves an apparent smoothness in the manipulation as perceived by those remote participants 104 viewing the manipulation. However, increasing the rate of updates increases an amount of network bandwidth required. Thus, a tradeoff exists between the amount of bandwidth required and the smoothness of the manipulation. In the preferred embodiment, 10 Hz was selected as an acceptable level considering this tradeoff.

In a preferred embodiment of the present invention, each workstation 108 maintains an original three-dimensional model of object 270. In this embodiment, the transformation matrix is defined as the matrix applied to the original three-dimensional model of object 270 to obtain each subsequent three-dimensional model of manipulated object 1220. This embodiment reduces errors that accumulate when the transformation matrix is determined between incremental manipulations of object 1220.

Implementation of Work Area

Figure 19:
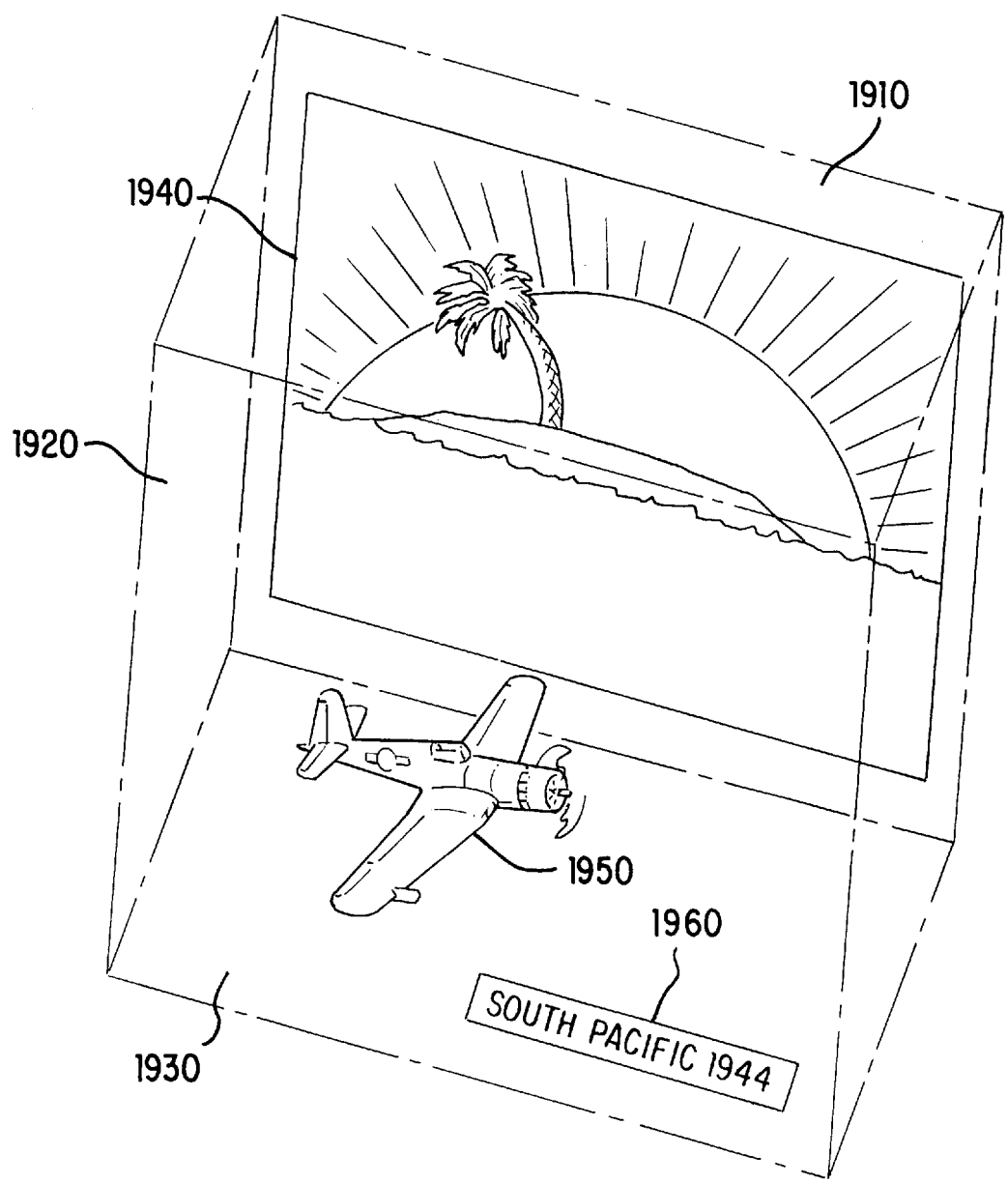
FIG. 19 is a diagram illustrating an implementation of work area according to one embodiment of the present invention.

FIG. 19 is a diagram illustrating an implementation of work area 210 according to one embodiment of the present invention. In this embodiment, work area 210 includes an image plane 1910, an object space 1920, and a text plane 1930. Image plane 1910 includes a two-dimensional image 1940. Object space 1920 includes an object 1950. Text plane 1930 includes a text area 1960.

Figure 20:
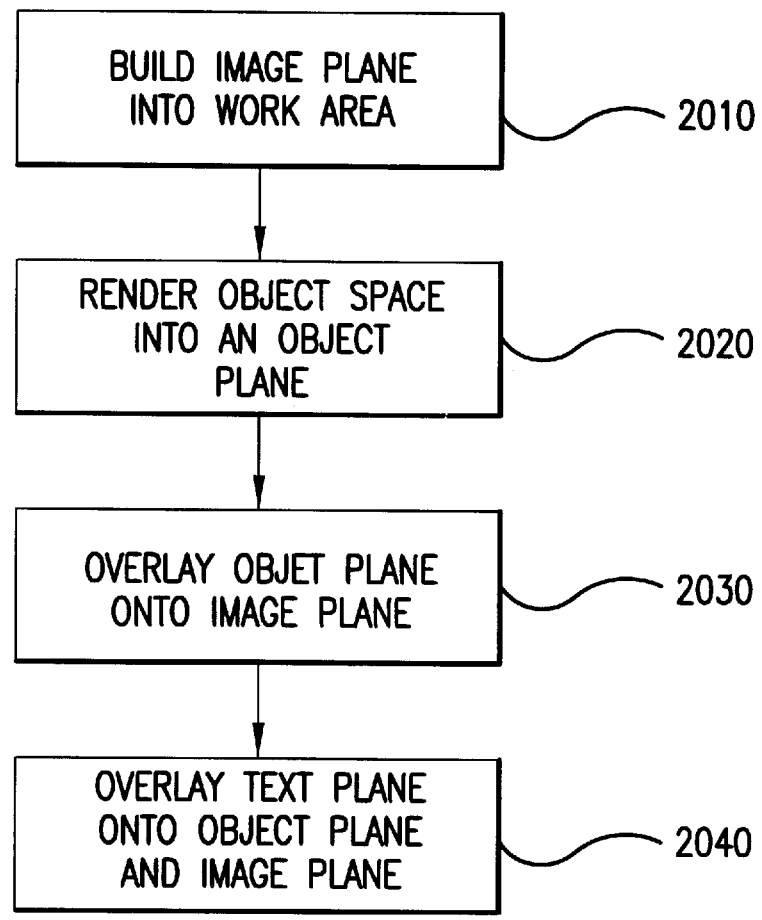
FIG. 20 is a diagram illustrating the steps performed by workstation in order to build the work area.

According to the present invention, workstation 108 builds work area 210 in a particular order. FIG. 20 is a diagram illustrating the steps performed by workstation 108 in order to build work area 210. In a step 2010, image plane 1910 including image 1940 is built into work area 210. In essence, image plane 1910 becomes a background for work area 210.

In a step 2020, object space 1920 including object 1950 is rendered into a two-dimensional image, according to techniques well known in the art, in what is referred to as an object plane (not shown). Object plane represents a projection of object space 1920 into a plane parallel to image plane 1910. In a step 2030, object plane is overlaid onto image plane 1910.

Because object space 1920 is three-dimensional and object 1950 is defined by a three-dimensional model, the present invention is capable of maintaining multiple objects 1950 at different depths (i.e., different positions along z-axis 370) within object space 1920. Thus, the rendering in step 2020 includes resolving the depths aspects of multiple objects 1950. In other words, a proper perspective relationship between multiple objects 1950 is maintained during the rendering of object space 1920.

After object plane has been overlaid onto image plane 1910, in a step 2040, text plane 1930 is overlaid onto object plane and image plane 1910. Text plane 1930 includes items such as text entry 280, drawing entry 290, cursor 260, and displays the above discussed annotations and gesturing. Thus, text plane 1930 becomes a foreground of work area 210. As discussed above, image plane 1910 becomes the background of work area 210 with the projection of object space 1920 sandwiched in between.

The above described steps serve to form a hierarchy among various items displayed in work area 210. For example, two-dimensional images remain in the background of work area 210. Rendered images of three-dimensional models of objects appear in work area 210 in front of two-dimensional images in the background or work area 210. Annotations, including text and freehand drawing, and gesturing appear in work area 210 in front of both the two-dimensional images in the background and the rendered images of the objects.

Although the invention has been described in detail in terms of specific embodiments, various modifications can be made without departing from the scope of the invention.

We claim:

1. In a collaborative work environment supporting a plurality of remote participants, a method for manipulating three-dimensional objects in a work area displayed on a workstation of each of the plurality of remote participants, the method comprising:

maintaining an original three-dimensional model in the workstation of each of the plurality of remote participants;

displaying an image of a three-dimensional object in the work area of each of the plurality of remote participants, said three-dimensional object defined by said original three-dimensional model;

manipulating said object by operating on said original three-dimensional model, said step of manipulating performed in response to input by one of the plurality of remote participants, said step of manipulating resulting in a manipulated object defined by a subsequent three-dimensional model, wherein said subsequent three-dimensional model is a transformation of said original three-dimensional model;

communicating said transformation to the remote participants other than said one of the plurality of remote participants; and displaying a manipulated image of said manipulated object in the work area of each of the plurality of remote participants thereby allowing each of the plurality of remote participants to collaboratively view and manipulate said object, wherein said manipulated object is generated in the workstation of each of the remote participants other than said one of the plurality of remote participants by applying said transformation to said original three-dimensional model.

2. The method of claim 1, further comprising the steps of:

performing a gesture in relation to said image of said object in the work area, said gesture performed in response to input from one of the plurality of participants;

communicating said gesture to each other of the plurality of participants; and displaying said gesture on the workstation of each of the plurality of participants.

3. The method of claim 2, wherein said gesture comprises annotating said image.

4. The method of claim 2, wherein said gesture comprises indicating a feature of said image via a cursor.

5. The method of claim 2, wherein said gesture comprises freehand drawing.

6. The method of claim 1, wherein said step of manipulating comprises a step of scaling said object, said step of scaling occurring proportionately in three dimensions.

7. The method of claim 1, wherein said step of manipulating comprises a step of cutting-and-pasting said object between the work area and a three-dimensional authoring tool operating on the workstation of said one of the plurality of participants.

8. The method of claim 1, wherein said step of manipulating comprises a step of translating said object in the work area.

9. The method of claim 1, wherein said step of manipulating comprises a step of rotating said object in the work area.

10. The method of claim 9, wherein said step of rotating is constrained to a single axis of rotation.

11. In a collaborative work environment among a plurality of remote participants, a method for manipulating three-dimensional objects in a graphical user interface (GUI) displayed on a workstation of each of the plurality of remote participants, the method comprising:

maintaining one or more original three-dimensional models in the workstation of each of the plurality of remote participants;

displaying one or more two-dimensional images in an image plane of the GUI;

displaying one or more three-dimensional objects in an object space of the GUI, said object space located in front of said image plane, said one or more three-dimensional objects defined by said one or more original three-dimensional models;

displaying one or more text areas in a text plane of the GUI, said text plane located in front of said image plane and said object space;

performing a manipulation on an object projected in said object plane, said manipulation performed by one of the plurality of remote participants, resulting in a manipulated object defined by a subsequent three-dimensional model, wherein said subsequent three-dimensional model is a transformation of said original three-dimensional model; and communicating said transformation to each other of the plurality of remote participants thereby allowing said manipulation to be viewed by each other of the plurality of remote participants.

12. The method of claim 11, wherein said manipulation is a scaling of said object, said scaling occurring proportionately in three dimensions.

13. The method of claim 11, wherein said manipulation is a cut-and-paste operation on said object, said cut-and-paste operation occurring between said object space of the GUI and a three-dimensional authoring tool operating on a workstation of said one of the plurality of participants.

14. The method of claim 11, wherein said manipulation is a rotation of said object in said object space.

15. The method of claim 14, wherein said rotation is restricted to a single axis of rotation.

16. An interactive, collaborative method for manipulating a three-dimensional object by a plurality of remote participants each having a workstation, the method comprising the steps of:

representing a three-dimensional object by means of an original three-dimensional model;

storing said original three-dimensional model on the workstation of each of the plurality of remote participants;

displaying a projected image of the three-dimensional object in a shared work area, said shared work area visible on the workstation of each of the remote participants, said projected image generated from said original three-dimensional model;

interactively manipulating the three-dimensional object within said shared work area, said manipulating performed with respect to said projected image by any one of the remote participants;

transmitting data to the workstation of each of the plurality of remote participants, said data representative of changes made to the three-dimensional object relative to said original three-dimensional model as a result of said manipulating;

generating a manipulated projected image of the three-dimensional object using said data and said original three-dimensional model, said generating performed by the workstation of each of the plurality of remote participants; and displaying said manipulated projected image of the three-dimensional object in said shared work area of each of the plurality of remote participants in real-time.

* * * * *